US011627425B2

(12) United States Patent
Fuhrmann et al.

(10) Patent No.: US 11,627,425 B2
(45) Date of Patent: Apr. 11, 2023

(54) LIGHTING DEVICE

(71) Applicant: SIGNIFY HOLDING B.V., Eindhoven (NL)

(72) Inventors: Peter Jens Fuhrmann, Aachen (DE); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/609,236

(22) PCT Filed: May 4, 2020

(86) PCT No.: PCT/EP2020/062241
§ 371 (c)(1),
(2) Date: Nov. 5, 2021

(87) PCT Pub. No.: WO2020/229205
PCT Pub. Date: Nov. 19, 2020

(65) Prior Publication Data
US 2022/0217488 A1 Jul. 7, 2022

Related U.S. Application Data

(60) Provisional application No. 62/846,803, filed on May 13, 2019.

(30) Foreign Application Priority Data

May 21, 2019 (EP) ..................................... 19175619

(51) Int. Cl.
*H04R 29/00* (2006.01)
*H05B 47/12* (2020.01)
(Continued)

(52) U.S. Cl.
CPC ............. *H04R 29/008* (2013.01); *G08B 5/36* (2013.01); *G10L 25/60* (2013.01); *H04R 1/326* (2013.01); *H05B 47/12* (2020.01)

(58) Field of Classification Search
None
See application file for complete search history.

(56) References Cited

U.S. PATENT DOCUMENTS 9,659,571 B2    5/2017    Van Der Schaar
2004/0162722 A1*  8/2004    Rex .......................... G10L 25/69
                                                    704/211

(Continued)

FOREIGN PATENT DOCUMENTS

GB    2375935 A    11/2002
JP    H06137933 A    5/1994
(Continued)

OTHER PUBLICATIONS

Di Blasio, Sonja, "A Subjective Investigation On the Impact of Irrelevant Speech Noise On Health, Well-Being and Productivity in Open-Plan Offices", Euronoise 2018—Conference Proceedings, pp. 1883-1890.

(Continued)

*Primary Examiner* — Kenny H Truong

(57) ABSTRACT

The invention provides a lighting device for determining and conveying an intelligibility of an audio signal, wherein the audio signal comprises a plurality of occurrences of a repeating audio feature, wherein each occurrence of the repeating audio feature comprises a respective value of an acoustic characteristic, wherein the lighting device comprises: a light source; a microphone for detecting the audio signal; a processor configured to: receive the audio signal from the microphone, determine a baseline value based on said audio signal, determine a positive intelligibility of the audio signal if the last occurrence of the repeating audio (Continued)

feature comprises a respective value of the acoustic characteristic being at least equal to the baseline value, or determine a negative intelligibility of the audio signal if the last occurrence of the repeating audio feature comprises a respective value of the acoustic characteristic being less than the baseline value, and control the light source to convey the determined positive and/or negative intelligibility of the audio signal via a lighting characteristic.

15 Claims, 3 Drawing Sheets

(51) Int. Cl.
  *G08B 5/36* (2006.01)
  *G10L 25/60* (2013.01)
  *H04R 1/32* (2006.01)

(56) References Cited

U.S. PATENT DOCUMENTS

| | | |
|---|---|---|
| 2009/0012794 A1 | 1/2009 | van Wijngaarden et al. |
| 2011/0188666 A1 | 8/2011 | Mason et al. |
| 2014/0089024 A1 | 3/2014 | Mason et al. |
| 2015/0102745 A1 | 4/2015 | Pijlman et al. |
| 2015/0179187 A1 | 6/2015 | Xiao et al. |
| 2015/0248898 A1* | 9/2015 | Loukina ........ G09B 19/04 704/239 |
| 2016/0163302 A1 | 6/2016 | Klabunde et al. |
| 2018/0228006 A1 | 8/2018 | Baker et al. |

FOREIGN PATENT DOCUMENTS

| | | |
|---|---|---|
| JP | 2012021969 A | 2/2012 |
| WO | 2012007746 A2 | 1/2012 |
| WO | 2015150927 A1 | 10/2015 |
| WO | 2018095861 A1 | 5/2018 |
| WO | 2018130314 A1 | 7/2018 |
| WO | 2018210588 A1 | 11/2018 |
| WO | 2019002327 A1 | 1/2019 |

OTHER PUBLICATIONS

SoundEar: https://soundear.com/de/
Sonicu: https://www.sonicu.com/

* cited by examiner

LIGHTING DEVICE

CROSS-REFERENCE TO PRIOR APPLICATIONS

This application is the U.S. National Phase application under 35 U.S.C. § 371 of International Application No. PCT/EP2020/062241, filed on May 4, 2020, which claims the benefit of European Patent Application No. 19175619.6, filed on May 21, 2019 and U.S. Provisional Application Ser. No. 62/846,803, filed on May 13, 2019. These applications are hereby incorporated by reference herein.

FIELD OF THE INVENTION

The invention relates to a lighting device for determining and conveying an intelligibility of an audio signal, wherein the lighting device comprises a light source, a microphone and a processor. The invention further relates to a system for determining and conveying an intelligibility of an audio signal, wherein the system comprises a at least two lighting devices according to the invention. The invention further relates to a method of determining and conveying an intelligibility of an audio signal, and to a computer program product. The invention further relates to an actuator device mutatis mutandis.

BACKGROUND OF THE INVENTION

Open offices gain popularity within businesses. Acoustic comfort and/or acoustic intelligibility are relevant to a business setting. Acoustic comfort may for example boost people productivity and people satisfaction, whereas intelligible speech may for example increase effectiveness in communication and presentation. Similar observations may be found within an entertainment setting, such as e.g. professional stages, stadia or theaters. Conversely, in some examples within a business setting, it may be required that speech is private and non-intelligible.

Therefore, real-time feedback on acoustic propagation within spaces may be an objective so as to obtain an insight in the acoustic comfort and/or acoustic intelligibility of sound (originating from a source of sound).

For example: It is known to provide means for visualizing the Sound Pressure Level (SPL) within a space, e.g. by means of a decibel meter (e.g. in a discotheque). Alerting users about their noise level is moreover found in WO2019/002327A1. Furthermore, US2016/0163302A1 discloses a sound attenuating panel with a light source embedded therein, which light source may be controlled based on increasing and/or decreasing noise levels. Furthermore, WO2018/210588A1 discloses establishing a propagation map of sound data, which is obtained from sound sensors comprised by a lighting network.

While said examples may disclose detecting noise levels and providing a feedback, e.g. by using the lighting infrastructure, none of the above may detect the intelligibility of a sound signal itself. Though it is known to provide smart assistants based on voice control, which may implement semantic analysis to a detected voice command, such as Amazon Alexa or Google Echo, such assistants still disadvantageously require high processing power and/or prefer a backend for computation.

SUMMARY OF THE INVENTION

It is an object of the invention to provide an improved lighting device for determining and conveying an intelligibility of an audio signal, which at least alleviates the problems and disadvantages mentioned above. Thereto, the invention provides a lighting device for determining and conveying an intelligibility of an audio signal, wherein the audio signal comprises a plurality of occurrences of a repeating audio feature, wherein each occurrence of the repeating audio feature comprises a respective value of an acoustic characteristic, wherein the lighting device comprises: a light source; a microphone for detecting the audio signal; a processor configured to: receive the audio signal from the microphone, determine a baseline value based on said audio signal, determine a positive intelligibility of the audio signal if the last occurrence of the repeating audio feature comprises a respective value of the acoustic characteristic being at least equal to the baseline value, or determine a negative intelligibility of the audio signal if the last occurrence of the repeating audio feature comprises a respective value of the acoustic characteristic being less than the baseline value, and control the light source to convey the determined positive and/or negative intelligibility of the audio signal via a lighting characteristic.

Said audio signal comprises a plurality of occurrences of a repeating audio feature. Said audio signal may for example be human speech or an audio (i.e. sound) fragment of human speech. The audio signal may for example originate from a person presenting in a space. The repeating audio feature may thereby e.g. be a characteristic sound, a vowel, an article, a word, a phrase, or a sentence; which may be repeating throughout the duration of the audio signal. Moreover, each occurrence of the repeating audio feature in the audio signal may comprise a respective value of an acoustic characteristic. In embodiments, said acoustic characteristic may be one of: A Sound Pressure Level (SPL), a frequency, or a sound quality, or a rhythm. These acoustic characteristics are common in the field of acoustics.

Consequently, the audio signal may comprise a repeating audio feature, wherein each individual occurrence of the repeating feature over time comprises its respective value of said acoustic characteristic. The lighting device according to the invention may therefore utilize this insight to determine the intelligibility of the audio signal (i.e. either positively or negatively intelligible) and subsequently convey the determined intelligibility, so as to provide feedback on said intelligibility of the audio signal. The processor is thereby configured to determine the intelligibility of the audio signal by comparing the respective value of the last occurrence of the repeating audio feature with a baseline value.

Therefore, since the lighting device according to the invention does not require interpreting the meaning of the repeating audio feature and/or does not require performing a semantic analysis on intelligibility, the present invention advantageously provides a more computationally efficient and/or power efficient apparatus for determining and conveying the intelligibility of the audio signal.

Hence, due to the limited processing power required, the capability of determining of the intelligibility of the audio signal may advantageously be enabled for a regular lighting device with sensing capabilities, thereby rendering an improved lighting device according to the invention. Such a lighting device may for example be an outdoor lighting device, an indoor lighting device, a luminaire, a light pole, a spot light, a LED strip, a TLED, a pixilated LED spot, or a wall-washer.

To be more specific: The lighting device according to the invention comprises a light source, a microphone and a processor. The microphone is arranged for detecting the audio signal and providing the detected (or: measured) audio signal to the processor. The processor receives said audio signal from the microphone and performs processing steps thereto. Optionally, the lighting device may be a connected lighting device with wireless connectivity. The wireless connectivity may enable the lighting device to communicate with other lighting devices according to the invention, and/or with other connected devices, such as devices within a wireless network.

The processor (in collaboration with said microphone) may thereby keep track of (or: listen to) each occurrence of each repeating feature within the audio signal. The processor may thereby distinguish between sources of sound with techniques commonly known in the field of acoustics. In some examples, the processor may be configured (or: programmed, or: commissioned) to keep track of (or: listen to) each occurrence of a limited group of repeating features within the audio signal. Such a limited group of repeating features, for example only vowels or articles (in grammar), may be predefined during installation or commissioning of the lighting device.

Moreover, as partly mentioned, the processor is further configured to determine a baseline value based on said audio signal. In embodiments, the processor may be configured to determine the baseline value based on at least the first occurrence of the repeating audio feature in the audio signal. Hence, the baseline value may serve as a reference value for determining intelligibility of the audio signal. For example, in initial examples, said baseline value may be predefined, such as a predefined threshold value. The lighting device may be commissioned with such a predefined threshold value, wherein the processor may be configured to receive a commissioning command comprising said predefined threshold value.

More elaboration on said predefined baseline value may be provided below. For example, said baseline value may be determined based on a sensor input and/or a user input. The sensor input may for example be a detected activity, gesture and/or people density. Said user input may for example be a age, or an identity.

As mentioned, the lighting device according to the invention determines the intelligibility of the audio signal and subsequently conveys the determined intelligibility, so as to provide feedback on said intelligibility of the audio signal. The processor is thereby configured to determine the intelligibility of the audio signal by comparing the respective value of the last occurrence of the repeating audio feature with a baseline value. Namely:

If the last occurrence of the repeating audio feature comprises a respective value of the acoustic characteristic being at least equal to the baseline value, the processor is configured to determine a positive intelligibility of the audio signal. Hence, the audio signal is intelligible, because the respective value of the acoustic characteristic of the last occurrence of the repeating feature is at least exceeding the threshold set by the baseline value.

For example, in case of a person reciting the poem In Flanders Fields by John McCrae, the last occurrence of the article "the" may comprise a Sound Pressure Level of 50 dB, whereas the baseline value may predetermined to be 45 dB, which renders the conclusion that the poem (at that point or occurrence of the article "the") is intelligible, i.e. positive intelligibility. The light source is thereby controlled accordingly.

Conversely, if the last occurrence of the repeating audio feature comprises a respective value of the acoustic characteristic being less than the baseline value, the processor is configured to determine a negative intelligibility of the audio signal. Hence, the audio signal is non-intelligible, because the respective value of the acoustic characteristic of the last occurrence of the repeating feature is not at least exceeding the threshold set by the baseline value.

For example, in case of a person reciting the poem In Flanders Fields by John McCrae, the last occurrence of the article "the" may comprise a Sound Pressure Level of 40 dB, whereas the baseline value may predetermined to be 45 dB, which renders the conclusion that the poem (at that point or occurrence of the article "the") is non-intelligible, i.e. negative intelligibility. The light source is thereby controlled accordingly.

In more specific examples, the baseline value may be determined via other correlations, which may for example be based on at least the first occurrence of the repeating audio feature in the audio signal. Namely:

In an embodiment, the processor may be configured to determine a respective value of the acoustic characteristic of the first occurrence of the repeating audio feature as the baseline value. Such an embodiment may be advantageous, because the first occurrence of the repeating audio feature in the audio signal may set the baseline, thereby providing a clear baseline from the start.

Alternatively: In an embodiment, the processor may be configured to determine an average of a respective value of the acoustic characteristic of each occurrence of the repeating audio feature as the baseline value. Such an average may for example be a running average. Such an embodiment may be advantageous, because the values of the acoustic characteristics of each respective occurrence of the repeating audio feature, and therefore the whole audio signal, is considered in the setting of the baseline value. Hence, a more robust baseline value may be envisioned.

Alternatively: In an embodiment, the audio signal may further comprise a trigger feature initiating the audio signal, wherein the trigger feature comprises a value of the acoustic characteristic; wherein the processor is configured to determine the value of the acoustic characteristic of said trigger feature as the baseline value. This advantageously enables controlling the setting of the baseline value. Namely: By knowing the trigger feature beforehand, the introduction (or: input) of the trigger feature into the acoustic signal allows for controlling setting the baseline. For example, a presenter knowing that the word "baseline" may be the trigger feature may set the baseline value by deliberately stating this word.

As partly mentioned, the processor is configured to control the light source of the lighting device to convey the determined positive and/or negative intelligibility of the audio signal via a lighting characteristic. Phrased alternatively, throughout all examples, the processor may control the light source to convey an indication of the determined positive and/or negative intelligibility via a lighting characteristic. The lighting characteristic is thereby indicative of the determined positive and/or negative intelligibility of the audio signal. Thus, the lighting characteristic outputs information on intelligibility. This advantageously enables providing feedback on the intelligibility of the audio signal via the light source and the lighting infrastructure; which are often prominently positioned within spaces and are therefore very suitable to convey information on intelligibility of the acoustic signal.

In an embodiment, the lighting characteristic may be a light modulation, a hue, a color temperature, a directionality, and/or a light intensity. Hue may be phrased as color. For example, a positive intelligibility may be conveyed by controlling the light source to emit a particular hue, such as green; whereas similarly the hue may be red for negative intelligibility.

For example, the light source of the lighting device may be emitting a particular light scene, but upon detecting a positive intelligibility the color temperature may be controlled to slightly warmer, or slightly colder in case of determining a negative intelligibility. Other combinations in color, hue, color temperature, directionality, intensity, etc. may moreover be envisioned.

Even further, in some embodiments thereof, said light modulation comprises Li-Fi or Visible Light Communication. Such an embodiment is advantageous, because the light modulation may comprise more information on said intelligibility of the acoustic signal. Furthermore, the determined positive and/or negative intelligibility of the audio signal may thereby be conveyed to other apparatuses which are equipped with a VLC/Li-Fi receiver.

As partly mentioned before, real-time feedback on acoustic propagation within spaces may be advantageous to obtain an insight in the acoustic comfort and/or acoustic intelligibility of sound, which sound may be originating from a source of sound. To further improve the ergonomics and effectiveness of such a feedback, the lighting device according to the present invention may convey the determined positive and/or negative intelligibility of the audio signal via the lighting characteristic in a particular direction, such as the direction from which the audio signal is originating relative to the lighting device. Thus, in an embodiment, the light source may be a directional light source. Moreover, in a further embodiment, the processor may be configured to: obtain a direction from which the audio signal is originating relative to the lighting device, and control the directional light source to convey the determined positive and/or negative intelligibility of the audio signal via the lighting characteristic in said direction. Since the determined positive and/or negative intelligibility is conveyed via the lighting characteristic, which is indicative of said intelligibility, in the direction of the source of the audio signal, the conveyed information on said intelligibility is addressed to the correct source and/or in the most effective direction (to convey such information).

In an embodiment, the directional light source may be an indirect light source, wherein the indirect light source illuminates a surface area oriented in said direction. Such an indirect light source may for example be a cove light source, a decorative light source, a wall-washer, a ceiling-washer, a floor light.

More specifically: In an embodiment, the processor may be configured to obtain said direction from a lighting system comprising a microphone array. Such an embodiment may be advantageous, since the lighting device may receive information (either wirelessly or via a wired connection), such as e.g. microphone readings, from other lighting devices according to the invention located at other locations in a space, e.g. forming a lighting system according to the invention; from which information the processor may determine the direction from which the audio signal is originating relative to the lighting device, via e.g. triangulation or other commonly known localization techniques.

Yet alternatively, in an embodiment, the microphone may be a directional microphone and the processor is configured to obtain said direction from the directional microphone. Such an embodiment is advantageous, because the lighting device may autonomously be able to determine the direction from which the audio signal is originating relative to the lighting device via said directional microphone. Said microphone according to the invention may alternatively be a microphone array. The microphone may alternatively be embedded in the lighting device. The lighting device may thereby be a luminaire. The microphone may also be part of an advanced sensor bundle comprised by the lighting device, which advanced sensor bundle may optionally provide wireless communication means.

Yet alternatively, in an embodiment, the microphone may be a first microphone and a second microphone, which first and second microphone are positioned on different positions on the lighting device. Such a local microphone array may also be suitable to determine a location of a sound source.

Since lighting devices are commonly directed to the function of providing functional and/or ambient lighting, i.e. having an illumination function, the control of the light source for conveying the determined positive and/or negative intelligibility may in some cases contravene the desire to provide said common illumination function. To solve such a mentioned contravening situation, the lighting device according to the invention may comprise at least one further light source. Thus, in an embodiment, the lighting device may comprise a further light source, wherein the further light source is arranged to provide ambient and/or functional lighting.

Said ambient lighting may for example be a light scene or ambient setting. Said functional lighting may for example be task light in a direction different from the direction to which the first light source conveys the determined intelligibility. More specifically, the light source according to the invention may comprise a footprint (or coverage area) different and non-overlapping from a footprint comprised by the further light source. Said ambient lighting may be white lighting. The further light source may be a conventional light source, or alternatively a LED light source. The further light source may be a LED strip, or an array for light sources, or a downlighter. The light source and the further light source may be controlled independently from each other.

The lighting device according to the invention may be located in a region of a space. The audio signal may originate from a source of sound within said space, which source may for example be located in a different region of said space. If a negative intelligibility may be determined in accordance with the present invention, the audio signal may consequently be non-intelligible in said region of the space. It may therefore be an objective to improve the intelligibility of the audio signal in said region. Hence, in an embodiment, the processor may be configured to control the further light source to transmit, if the processor determines a negative intelligibility of the audio signal, at least a part of said audio signal via a Li-Fi signal or a VLC signal. Such an embodiment is advantageous because the audio signal is forwarded in the region illuminated by the further light source of the lighting device by means of VLC and/or Li-Fi. A device with a VLC and/or Li-Fi receiver may therefore be able to receive said respective signal and reconstruct said audio signal.

For example, a person may be located in a far corner of a theatre and may be listening to a presentation of a presenter, which the person at a certain point in time may not hear, because the audio signal (i.e. speech) of the presenter is not intelligible anymore in said corner. As the lighting device according to the invention may determine that the audio signal is not intelligible and convey this information to the presenter, at the same time the further light source of the lighting device may forward said audio signal (as detected by the microphone but determined as non-intelligible in respect to said baseline value) via a VLC or Li-Fi signal. A mobile device of the person located in the far corner may then receive said audio signal (i.e. speech) of the presenter on its mobile device, and for example run applications to amplify or emphasize said audio signal, e.g. transforming the audio signal in written words displayed on the mobile device so as to allow the person to read along.

Similarly, yet alternatively, in an embodiment, the lighting device may comprise a speaker, wherein the processor may be configured to control the speaker to transmit, if the processor determines a negative intelligibility of the audio signal, at least a part of said audio signal. The speaker may thereby amplify the audio signal if intelligibility is negative in a region associated with the lighting device.

Yet alternatively, in an embodiment, the lighting device may comprise a speaker, wherein the processor may be configured to control the speaker to transmit, if the processor determines a positive intelligibility of the audio signal, a masking signal at least partly based on said audio signal. Such an embodiment is advantageous, e.g. when an audio signal is intended to be private, because the lighting device according to the invention has a speaker transmitting a masking signal to erase the intelligibility of the audio signal. This may be advantageous for open offices. Sound cancellation and masking technologies as such are known in the art, e.g. for ear phones.

It is a further object of the invention to provide an improved system for determining and conveying an intelligibility of an audio signal, which at least alleviates the problems and disadvantages mentioned above. Thereto, the invention further provides a system for determining and conveying an intelligibility of an audio signal, wherein the system comprises at least two lighting devices according to the invention. Thereby, advantages and/or embodiments applying to the device according to the invention may mutatis mutandis apply to said system according to the invention. In aspects, said system may be a lighting system, or e.g. an array of luminaires.

Furthermore, said system may comprise a first lighting device and a second lighting device. In an embodiment, the processor of only the first lighting device may be configured to obtain a direction from which the audio signal is originating relative to the lighting device, and control the directional light source to control the directional light source to convey the determined positive and/or negative intelligibility of the audio signal via the lighting characteristic in said direction. Therefore, the first lighting device may take over the function of said providing of directional light from the second lighting device. This may be advantageous if the second lighting device may not have a field of view towards the origins of the audio signal.

It is a further object of the invention to provide an improved method, which at least alleviates the problems and disadvantages mentioned above. Thereto, the invention further provides a method of determining and conveying an intelligibility of an audio signal, wherein the audio signal comprises a plurality of occurrences of a repeating audio feature, wherein each occurrence of the repeating audio feature comprises a respective value of an acoustic characteristic, wherein the method comprises: detecting the audio signal; determining a baseline value based on said audio signal; determining a positive intelligibility of the audio signal if the last occurrence of the repeating audio feature comprises a respective value of the acoustic characteristic being at least equal to the baseline value, or determining a negative intelligibility of the audio signal if the last occurrence of the repeating audio feature comprises a respective value of the acoustic characteristic being less than the baseline value, and controlling the light source to convey the determined positive and/or negative intelligibility of the audio signal via a lighting characteristic. Thereby, advantages and/or embodiments applying to the device according to the invention may mutatis mutandis apply to said method according to the invention.

For example, in embodiments, the method may further comprise: determining a respective value of the acoustic characteristic of the first occurrence of the repeating audio feature as the baseline value; or determining an average of a respective value of the acoustic characteristic of each occurrence of the repeating audio feature as the baseline value. In an embodiment, the method may comprise determining the value of the acoustic characteristic of a trigger feature as the baseline value, wherein said trigger feature initiates the audio signal and comprises a value of the acoustic characteristic, wherein the audio signal comprises the trigger feature.

For example, in embodiments, the method may further comprise obtaining a direction from which the audio signal is originating relative to the lighting device, and controlling the directional light source to convey the determined positive and/or negative intelligibility of the audio signal via the lighting characteristic in said direction. Thereby, the method may further comprise obtaining said direction from a lighting system comprising a microphone array, or wherein the microphone is a directional microphone and the processor is configured to obtain said direction from the directional microphone.

For example, the method may further comprise providing ambient lighting with a further lighting device.

In aspects of the invention, in a further example, elaborating on the baseline value being predefined, the baseline value may be determined by obtaining a parameter value. In such examples, the baseline value may thus be determined based on said audio signal in conjunction with said obtained parameter value. In alternative examples, the present invention may be characterized by the processor being configured to determine the baseline value solely based on said parameter value. Hence, in an embodiment, the processor may be configured to obtain a parameter value, wherein the parameter value may be indicative of one of: a space geometry, an age of a person or an average age of persons, an activity of a person or activities of persons, a gesture, and/or an identified object within a space. The processor may further be configured to determine the baseline value based on said parameter value. Thereby, the parameter value may for example be obtained from a further device, such as a user input device (e.g. a smartphone or remote control), or such as a sensor device (e.g. a camera detecting properties and/or activities of a space wherein the lighting device is mounted).

More specifically, the audio signal may for example be propagating throughout a space wherein the lighting device is present. The space may comprise a particular geometry, which particular geometry may be detected by a camera (either internal to (comprised by) or external to (separate from) the lighting device). The processor is configured to obtain a parameter value indicative of said particular geometry from the camera, and subsequently determine the baseline value based on said parameter value, either taking into account the audio signal or not. For example, a confined room may comprise a higher predefined baseline value compared to a high-bay or open space where acoustic propagation properties are poor.

Similar examples may be envisioned. For example, the space may comprise an audience (i.e. a plurality of persons) which perform an activity. Said activity may for example be sitting, reading, dancing, etc. The predefined baseline value for a sitting audience may e.g. be lower compared to a dancing audience, because the concentration of sitting people is generally more suited for acoustic intelligibility of an audio signal (of a sound source, such as e.g. a presenter).

Similarly, the predefined baseline value may be based on an average age of a person (e.g. a presenter causing the audio signal) or persons (e.g. audience listening to said presenter). A predefined baseline value for children, adolescents and/or elderly may therefore be different. Similarly, an object may be detected within such a space, such as an obstacle for acoustic propagation such as a cubicle or curtain. The predefined baseline value may be based on the obtained parameter value indicative of said detected objected. Similarly, the processor may obtain the parameter value from a camera or other sensor.

Hence, considering the above, in an embodiment, the lighting device may comprise a sensor for detecting an input value, wherein the processor is configured to determine said baseline value based on said detected input value. Said sensor may be a PIR sensor, a temperature sensor, a biophysical sensor, a heartrate sensor, a camera, a light sensor, a thermopile array, a scent sensor, an RF receiver, and/or a microphone, and/or a sensor bundle comprising any one of the preceding sensors. The input value may for example be indicative of: age, a scent, an object, an activity, a person identity, a sound, a geometry, a people density, etc.

As mentioned, in more specific examples, the baseline value may be determined via other correlations, which may for example be based on at least the first occurrence of the repeating audio feature in the audio signal.

In further examples, the determined baseline value may be configurable and/or adjustable. Hence, in an embodiment, the processor is configured to adjust the determined baseline value based on an external input. The external input may for example be received from a sensor (e.g. a camera) or user input means (e.g. a smartphone). The external input may for example be age of an audience, language of an audience, an identity of a person(s), an activity, a gesture, and/or a people density.

Thus, for example, the age of an audience and language proficiency may have an influence on the required intelligibility of the audio signal. The determined baseline may therefore be dynamically readjusted during the audio signal based on feedback from the audience (for instance via a smartphone app determining age and language proficiency of the audience, or a vision sensor determining that the audience experiences difficulties understanding (e.g. person forming a cup gesture with his hand on the ear). The external input may further be a trigger of a start of an event. In other embodiments, the baseline value may be determined based on the baseline value of a previous audio signal.

In aspects, a system is provided comprising at least two lighting devices according to the invention, wherein the baseline value of a first lighting device is different from the baseline value of a second lighting device. Such a situation may occur, because the first lighting device may be installed at a different area compared to the second lighting device. The external inputs, as mentioned above, may therefore be different, hence the determined and/or adjusted baseline value. Thus, the baseline value is locally adjustable based on a region wherein the lighting device is installed.

Even further, in aspects of the invention, there is provided: an actuator device for determining and conveying an intelligibility of an audio signal, wherein the audio signal comprises a plurality of occurrences of a repeating audio feature, wherein each occurrence of the repeating audio feature comprises a respective value of an acoustic characteristic, wherein the device comprises: an actuator; a microphone for detecting the audio signal; a processor configured to: receive the audio signal from the microphone, determine a baseline value based on said audio signal, determine a positive intelligibility of the audio signal if the last occurrence of the repeating audio feature comprises a respective value of the acoustic characteristic being at least equal to the baseline value, or determine a negative intelligibility of the audio signal if the last occurrence of the repeating audio feature comprises a respective value of the acoustic characteristic being less than the baseline value, and control the actuator to convey the determined positive and/or negative intelligibility of the audio signal via a lighting characteristic. The actuator may be a light source, a sound source, a RF beacon, a vibrating means, a heating means, etc. Thereby, advantages and/or embodiments applying to the lighting device according to the invention may mutatis mutandis apply to said actuator device according to the invention.

BRIEF DESCRIPTION OF THE DRAWINGS

The invention will now be further elucidated by means of the schematic non-limiting drawings.

DETAILED DESCRIPTION OF THE EMBODIMENTS

As mentioned above, real-time feedback on acoustic propagation within spaces may be advantageous to obtain an insight in the acoustic comfort and/or acoustic intelligibility of sound originating from a sound source, such as e.g. a human speaking being able to receive feedback on how far and to what extent it's speech is intelligible. Thereby, it is an object of the invention to provide an improved lighting device, which does not require performing a computationally intensive semantic analysis and the corresponding processing power, so as to determine intelligibility of an audio signal and convey information thereof (e.g. as feedback to the sound source).

Figure 1:
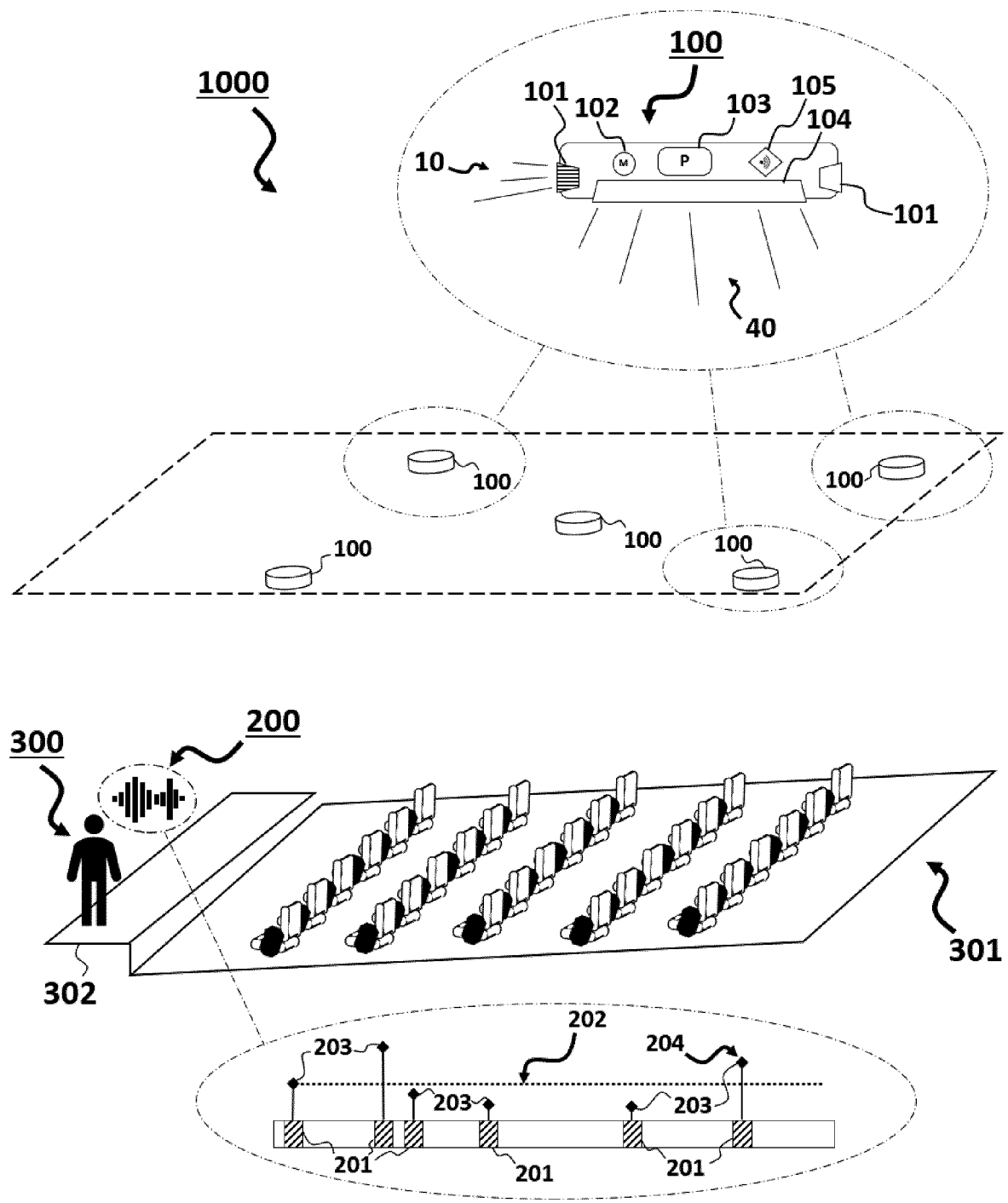
FIG. 1 depicts schematically an embodiment of a lighting system according to the invention comprising a plurality of lighting devices according to the invention.

FIG. 1 depicts schematically, by non-limiting example, an embodiment of a lighting system 1000 according to the invention. The lighting system 1000 comprises a plurality of lighting devices 100 according to the invention. The lighting system 1000 is installed in a theatre 301 comprising a main stage 302 in front of an audience. The lighting devices 100 are mounted on a ceiling of the theatre 301. The lighting devices 100 are luminaires. The lighting devices 100 are thereby distributed and commissioned accordingly, i.e. their respective location and control address are known. The lighting devices 100 are distributed in a grid formation, but may alternatively be distributed differently, such as randomly. Yet alternatively, not explicitly depicted, a single lighting device without being part of a system may suffice to achieve the objectives of the invention.

The main stage 302 of the theatre hosts a presenter 300. The presenter 300 is presenting and thereby emitting an audio signal 200. Thus, the audio signal 200 is human speech. The speech comprises sentences and words. The audio signal 200 propagates through the theatre 301. To facilitate the presenter 300 in the presenting activity, it is advantageous to convey information to the presenter 300 about the intelligibility of his/her speech throughout the theatre 301. This is met by a lighting device 100 according to the present invention.

The audio signal 200 is a fragment of the speech of the presenter 300. Here, the audio signal 200 is forty seconds in duration. This fragment may alternatively be any other duration, e.g. ten seconds in duration, thirty seconds in duration, one minute in duration, or at least one minute in duration. The audio signal 200 comprises a plurality of occurrences of a repeating audio feature 201. Here, the repeating audio feature is the word "you". FIG. 1 depicts schematically six occurrences of the repeating audio feature 201. Alternatively, the repeating audio feature may be any other word, such as a word often repeated in an average sentence in social interaction, e.g. "I", "we", "thank you", "how", "today", "us", "ohh", etc. Alternatively, the repeating audio feature may be a characteristic sound, a vowel, an article, a phrase, or a sentence.

Each occurrence of the repeating audio feature 201 in the audio signal 200 comprises a respective value 203 of an acoustic characteristic. Here, the acoustic characteristic is the Sound Pressure Level (SPL). Said acoustic characteristic may alternatively be any other parameter suitable for acoustic characterization, such as e.g. a frequency, or a sound quality, or a rhythm. Consequently, each individual occurrence of the repeating audio feature 201 comprises a respective value 203 of said acoustic characteristic, i.e. the SPL. (Although FIG. 1 does not differentiate in numbering for each occurrence but provides a single reference 201 for each occurrence of the repeating audio feature and provides reference 203 for its respective value in terms of the acoustic characteristic).

Referring to FIG. 1, the lighting device 100 comprises a directional light source 101. The directional light source 101 is arranged for illuminating in a direction essentially horizontal to the ceiling of the theatre 301, thereby providing a wall-washing effect on the ceiling surface. Moreover, the directional light source 101 is arranged along the circumference of the lighting device 100 and comprises segments along said circumference, wherein each segment is individually controllable so as to allow directional illumination 10 in a particular direction relative to the lighting device 100. The directional light source may for example be a set of LED lights, a LED strip, a set of spots, or a set of halogen lamps, etc. The lighting device 100 further comprises a second light source 104. The second light source 104 is a LED light source providing ambient lighting 40. Therefore, the ambient lighting 104 is arranged for illuminating the theatre 301 and providing the desired lighting conditions therein. For example, the ambient lighting 104 may comprise a (dynamic) lighting scene or e.g. functional lighting.

The lighting device 100 further comprises a microphone 102 and a processor 103. The microphone 102 listens to the acoustics within the theatre 301 and is able (in collaboration with the intelligence of the processor) to recognize and/or distinguish the audio signal 200 of the presenter 300. Therefore, the microphone 102 and the processor 103 are collaboratively able to receive the fragment of forty seconds of audio signal 200 and identify the repeating audio feature 201 of the word "you" therein; and also the SPL value 203 for each occurrence of said word "you" in the audio signal 200.

The lighting device 100 also comprises a transceiver 105 for wireless communication with other lighting devices according to the invention. Thereby, sensor data may be exchanged. The wireless communication is via ZigBee. Alternatively, each lighting device may exchange sensor data via a Bluetooth, RF, IR, VLC, Li-Fi, and/or UWB connection, which may be facilitated by the transceiver 105. The transceiver is however optional and alternative embodiments may not require have such a transceiver.

Still referring to FIG. 1, the microphone 102 detects the audio signal 200 and forwards the detected audio signal 200 to the processor 103 (i.e. e.g. data of the detected audio signal 200). The processor 103 receives the audio signal 200 from the microphone 102 and based thereon determines a baseline value 202 of the acoustic characteristic. The processor 103 determines the baseline value 202 based on at least the first occurrence of the repeating audio feature 201 in the audio signal 200 and its respective value 203 of the acoustic characteristic of SPL. Here, as depicted in FIG. 1, said baseline value 202 is determined by the processor selecting the respective value 203 of the acoustic characteristic (i.e. SPL) of the first occurrence of the repeating audio feature 201 as the baseline value 202.

Furthermore, at each subsequent occurrence of the repeating audio feature 201, the processor 103 of the lighting device 100 is able to determine an intelligibility of the audio signal 200. The intelligibility of the audio signal 200 is thus evaluated at the respective location of the respective lighting device within the theatre 301. This location is representative for a part of the theatre 301. Said intelligibility is positive if the value 203 of the acoustic characteristic (i.e. SPL) of the respective subsequent occurrence of the repeating audio feature 201 is at least equal to the baseline value 202; or conversely, this intelligibility is negative if the value 203 of the acoustic characteristic (i.e. SPL) of the respective subsequent occurrence of the repeating audio feature 201 is less than the baseline value 202.

Thus, considering the audio signal 200 has been detected in full and with all six occurrences of the repeating audio signal 200, the processor 103 determines in the present embodiment a positive intelligibility of the audio signal 200; because the last occurrence of the repeating audio feature 201 comprises a respective value 204 of the acoustic characteristic (i.e. SPL) is larger than the baseline value 202.

Figure 2A:
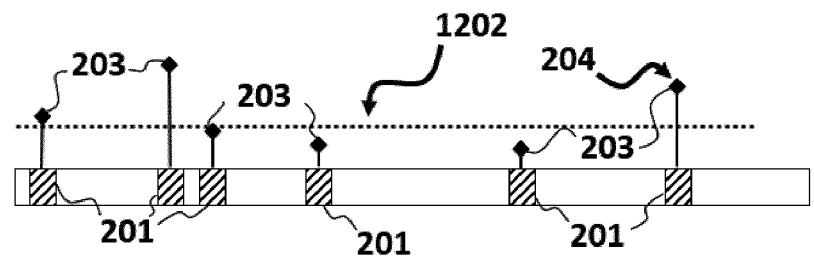
FIGS. 2A, 2B and 2C depict schematically embodiments for determining a baseline value based on an acoustic signal.

In alternative embodiments, which are similar to the embodiment depicted in FIG. 1, said baseline may be determined differently. In an embodiment, partly schematically depicted in FIG. 2A, the processor determines an average value 1202 by considering the SPL of each of the six occurrences of the repeating audio feature. This average value 1202 is then taken as the baseline value.

Figure 2B:
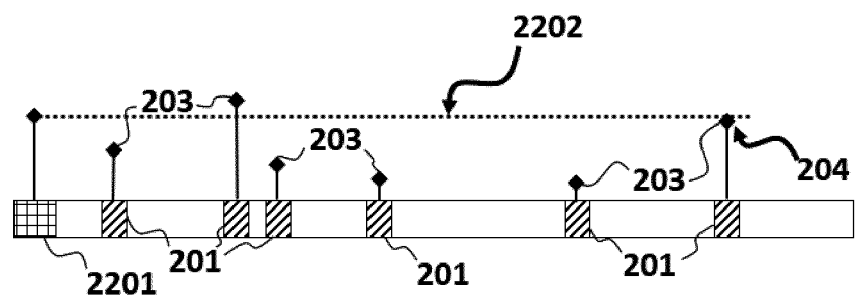

In an embodiment, partly schematically depicted in FIG. 2B, the audio signal comprises a trigger feature 2201 initiating the audio signal. The trigger feature 2201 is the phrase "can you hear me". The microphone receives the audio signal and the processor recognizes the trigger feature 2201. The trigger feature thereby initiates the audio signal which is assessed by the processor. Yet alternatively, the audio signal may already be initiated otherwise, and the trigger feature may be recognized during the start and end of the audio signal. Furthermore, the processor determines the value 2202 of the acoustic characteristic (i.e. SPL) of said trigger feature 2201 as the baseline value.

Figure 2C:
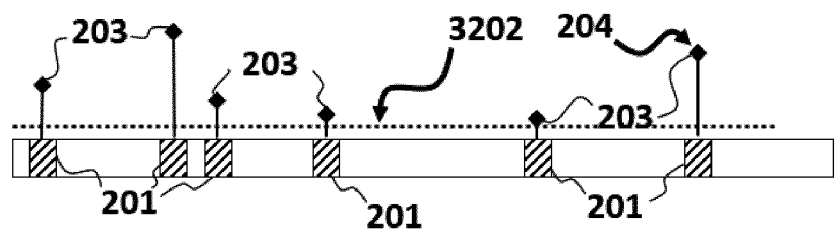

In an embodiment, partly schematically depicted in FIG. 2C, the baseline value is a predefined threshold value 3202. The predetermine threshold value 3202 may be dependent on the audio signal. This predefined threshold value 3202 may be provided to the processor of the lighting device during commissioning and/or installation. It may alternatively be set by the presenter by means of a user input device, which user input device wirelessly connects with the lighting device via said transceiver. This also advantageously allows the presenter and/or a commissioner to customize the predefined threshold values for each individual lighting device within the theatre. Thus, a means is advantageously provided to adjust the sensitivity of the lighting devices in view of the determination of the intelligibility of audio signals.

Referring back to FIG. 1, upon determining the positive intelligibility of the audio signal 200, the processor 103 controls the directional light source 101 to convey the determined positive intelligibility into the theatre 301 and in the direction of the presenter 300. The segment of the directional light source 101 pointing in said direction is then controlled to emit light comprising particular lighting characteristic. Here, said lighting characteristic is the color green, but alternatively may be any other lighting characteristic such as modulation, color temperature, pattern, light intensity, etc. Here, the processor determines said direction, which is the direction from which the audio signal 200 is originating relative to the lighting device 100, by evaluating the information related to the acoustic signal 200 as received by at least one other microphone of another lighting device 100 in the theatre 301, which is exchanged via said wireless communication link enabled by the transceiver 105. Since the lighting devices 100 of the lighting system 1000 are ordered in a grid and comprise a microphone, acoustic localization is possible when the lighting devices are communicating and sharing measurement data of their respective microphones.

Alternatively, in embodiments wherein the lighting device operates autonomously without feedback from other devices, the microphone may be a directional microphone and the processor obtains said direction from the directional microphone (and/or its measurement data provided). Said directional microphone may also be understood as two microphones comprised by a lighting device with a predefined distance therebetween, hence a local microphone array. Yet alternatively, in such autonomous embodiments, said direction may be estimated with a certain degree of accuracy by the processor by means of computational analysis. Moreover, in embodiments, said direction may be provided by means of a user input, such as a manual configuration step indicating the direction of e.g. the stage within the theatre.

All in all, the processor 103 controls the directional light source 101 to convey the determined positive intelligibility in the determined direction, i.e. by controlling the respective segment of the directional lighting device corresponding to said direction.

The lighting device 100 according to the invention therefore utilizes the insight that each occurrence of the repeating feature 201 in the audio signal 200 comprises a respective value 203 of the acoustic characteristic in order to determine the intelligibility of the audio signal 200 (i.e. either positively or negatively intelligible) and subsequently convey the determined intelligibility, so as to provide feedback on said intelligibility of the audio signal 200. The processor 103 is thereby configured to determine the intelligibility of the audio signal 200 by comparing the respective value 204 of the last occurrence of the repeating audio feature 201 with a baseline value 202.

In a non-limiting embodiment (not depicted), which is partly similar to the embodiment depicted in FIG. 1, the second light source which provides ambient lighting is suitable for emitting Light Communication signals (either VLC or Li-Fi). If the processor determines negative intelligibility, the part of the audio signal, which is being received by the microphone and is processed by the processor after that instance of determining the intelligibility and until a new intelligibility is determined, is translated into Light Communication signals and emitted by the second light source into the theatre. A mobile device with a Light Communication receiver may receive the signals and convert back to either audio or text, or alternatively use said data for other applications. Audience which may not be able to receive an intelligible audio signal from the presenter, may therefore be provided with a Light Communication signal providing said audio signal, such that said audience may still be able to follow a presentation, or at least follow it with e.g. subtitles or commentary.

Alternatively, in a further non-limiting embodiment (not depicted), which is partly similar to the embodiment depicted in FIG. 1, the lighting device comprises a speaker. If the processor determines negative intelligibility, the part of the audio signal, which is being received by the microphone and is processed by the processor after that instance of determining the intelligibility and until a new intelligibility is determined, is transmitted via the speaker into the theatre. This facilitates complementing the audio signal of the presenter locally.

Figure 3:
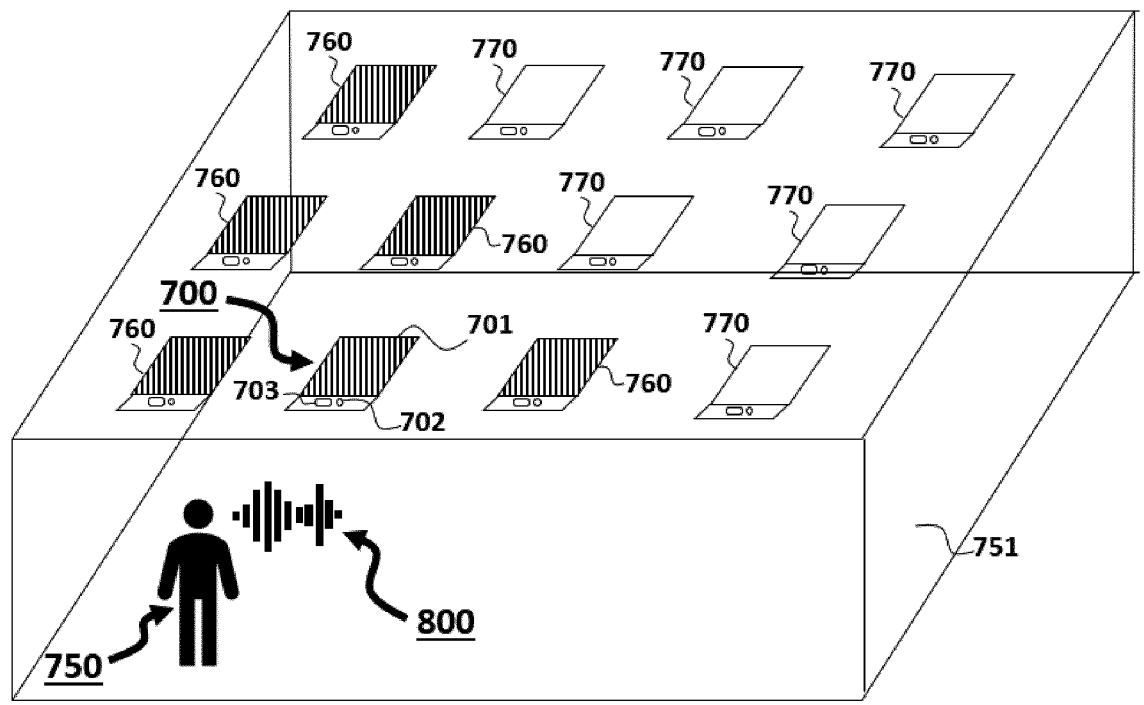
FIG. 3 depicts schematically an embodiment of a lighting device according to the invention.

FIG. 3 depicts schematically, by non-limiting example, an embodiment of a lighting device 700 according to the invention. The lighting device 700 comprises a light source 701, a microphone 702, and a processor 703. The lighting device 700 is a luminous ceiling panel. This may be advantageous as luminous ceiling panels are structurally mounted in a space. The lighting device 700 is mounted in the ceiling of an open office area 751. The open office area 751 further comprises an array of luminous ceiling panels, the lighting device 700 being one thereof. Here, by non-limiting example, all said luminous ceiling panels operate autonomously. The open office area 751 also comprises a person 750 speaking. The person 750 may e.g. be in a confidential conversation/meeting and would like to assess how far its speech is intelligible.

The person 750 is a source of sound because he/she is speaking. Thus, the person 750 generates an audio signal 800. Thus, the audio signal 800 is human speech. The speech comprises sentences and words. The audio signal 800 propagates through the open office space 751. The audio signal is thereby, at each instance in time, the last 30 seconds of the persons speech. Alternatively, other periods of time, e.g. periods less than a minute or less than five minutes, may be considered.

The audio signal 800 comprises a plurality of occurrences of a repeating audio feature. The repeating audio feature is the vowel "O". Each occurrence of the repeating audio feature in the audio signal 200 comprises a respective value of an acoustic characteristic. Here, the acoustic characteristic is the acoustic frequency (i.e. pitch) of the vowel. Thus, the audio signal comprises a plurality of occurrences of the vowel "O", wherein each occurrence is characterized by its own respective frequency value.

The microphone 702 of the lighting device 700 detects the audio signal and forward its measurements to the processor 703. The processor 701 receives the audio signal from the microphone 702 and determines a baseline value based on the audio signal 800. That is: the baseline value is selected to be the frequency value of the first occurrence of the vowel "O" in the audio signal 800.

The processor 703 of the lighting device 700 subsequently determines a positive intelligibility of the audio signal 800 if the last occurrence of the repeating audio feature has a frequency value which is at least equal to the baseline value. The processor 703 of the lighting device 700 subsequently determines a negative intelligibility of the audio signal 800 if the last occurrence of the repeating audio feature has a frequency value which is less than the baseline value. Here, the processor 703 determines a positive intelligibility, because the audio signal of the person is intelligible. Similarly, other luminous ceiling panels 760 in the array also determine a positive intelligibility based on their own autonomous assessment. However, some other luminous ceiling panels 770 in the array conversely determine a negative intelligibility based on their own autonomous assessment. The latter luminous ceiling panels are for example located further away from the person, or are located in an acoustically damped position within the open office area 751 (e.g. due to cubicles, curtains, glass, plants, etc.).

As a result of the positive determined intelligibility, the processor 703 controls the light source 701 to emit a blinking blue light, so as to convey the determine positive intelligibility to the person 750 and into the open office area 751. Similarly, the luminous ceiling panels 760 with a positive determined intelligibility do the same. Conversely, the luminous ceiling panels 770 with a negative determined intelligibility emit a red light, or are alternatively switched off. Other lighting characteristics, as mentioned before, may also envisioned. For example, said conveying the intelligibility (or: the indication of the intelligibility) may be by changes in color temperature, such as shifts in 10 degrees Kelvin, or by various known types of light communication.

Therefore, since the lighting device 700 does not require interpreting the meaning of the repeating audio feature and/or does not require performing a semantic analysis on intelligibility, the present invention advantageously provides a more computationally efficient and/or power efficient apparatus for determining and conveying the intelligibility of the audio signal, which is an advantageous feedback to the person 750.

Figure 4:
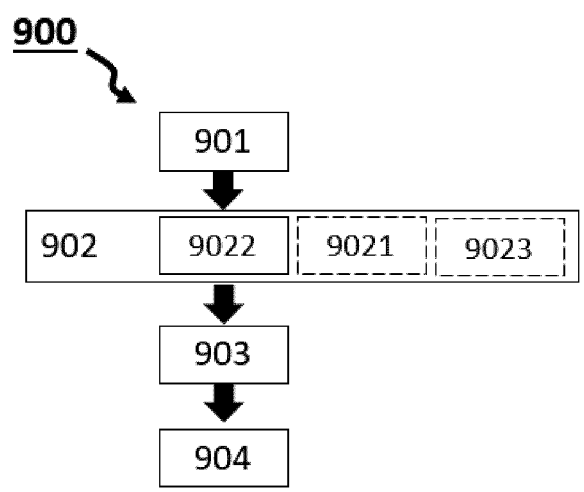
FIG. 4 depicts schematically an embodiment of a method according to the invention.

FIG. 4 depicts schematically, by non-limiting example, a method 900 of determining and conveying an intelligibility of an audio signal. The audio signal thereby comprises a plurality of occurrences of a repeating audio feature, wherein each occurrence of the repeating audio feature comprises a respective value of an acoustic characteristic. Said acoustic characteristic may for example be SPL or frequency.

The first step 901 of the method is detecting the audio signal with a microphone. The second step 902 is to determine a baseline value based on said audio signal, as elaborated in the examples before. Thus, sub-steps may be present in determining the baseline value, such as for example: a step 9021 of determining a respective value of the acoustic characteristic of the first occurrence of the repeating audio feature as the baseline value; or a step 9022 of determining an average of a respective value of the acoustic characteristic of each occurrence of the repeating audio feature as the baseline value; or a step 9023 determining the value of the acoustic characteristic of a trigger feature as the baseline value, wherein said trigger feature initiates the audio signal and comprises a value of the acoustic characteristic, wherein the audio signal comprises the trigger feature.

A third step 903 comprises determining a positive intelligibility of the audio signal if the last occurrence of the repeating audio feature comprises a respective value of the acoustic characteristic being at least equal to the baseline value, or determining a negative intelligibility of the audio signal if the last occurrence of the repeating audio feature comprises a respective value of the acoustic characteristic being less than the baseline value.

A fourth step 904 comprises controlling the light source to convey the determined positive and/or negative intelligibility of the audio signal via a lighting characteristic.

In an embodiment (not depicted), the method may further comprise obtaining a direction from which the audio signal is originating relative to the lighting device, and controlling the directional light source to convey the determined positive and/or negative intelligibility of the audio signal via the lighting characteristic in said direction. In an embodiment (not depicted), the method may further comprise providing ambient lighting with a further lighting device.

The invention claimed is:

1. A lighting device for determining and conveying an intelligibility of an audio signal, wherein the audio signal comprises a plurality of occurrences of a repeating audio feature, wherein each occurrence of the repeating audio feature comprises a respective value of an acoustic characteristic, wherein the lighting device comprises:
    a light source;
    a microphone for detecting the audio signal;
    a processor configured to:
        receive the audio signal from the microphone,
        determine a baseline value based on said audio signal,
        determine a positive intelligibility of the audio signal if the last occurrence of the repeating audio feature comprises a respective value of the acoustic characteristic being at least equal to the baseline value, or
        determine a negative intelligibility of the audio signal if the last occurrence of the repeating audio feature comprises a respective value of the acoustic characteristic being less than the baseline value, and
        control the light source to convey the determined positive and/or negative intelligibility of the audio signal via a lighting characteristic.

2. The lighting device according to claim 1, wherein the processor is configured to determine a respective value of the acoustic characteristic of the first occurrence of the repeating audio feature as the baseline value.

3. The lighting device according to claim 1, wherein the processor is configured to determine an average of a respective value of the acoustic characteristic of each occurrence of the repeating audio feature as the baseline value.

4. The lighting device according to claim 1, wherein the audio signal further comprises a trigger feature initiating the audio signal, wherein the trigger feature comprises a value of the acoustic characteristic;
    wherein the processor is configured to determine the value of the acoustic characteristic of said trigger feature as the baseline value.

5. The lighting device according to claim 1, wherein the acoustic characteristic is one of: a Sound Pressure Level, a frequency, or a sound quality.

6. The lighting device according to claim 1, wherein the lighting characteristic is a light modulation, a hue, a color temperature, a directionality, and/or a light intensity.

7. The lighting device according to claim 6, wherein said light modulation comprises Li-Fi or Visible Light Communication.

8. The lighting device according to any one of the preceding claim 1, wherein the light source is a directional light source.

9. The lighting device according to claim 8, wherein the processor is configured to:
    obtain a direction from which the audio signal is originating relative to the lighting device, and control the directional light source to convey the determined positive and/or negative intelligibility of the audio signal via the lighting characteristic in said direction.

10. The lighting device according to claim 9,
wherein the processor is configured to obtain said direction from a lighting system comprising a microphone array, or
wherein the microphone is a directional microphone and the processor is configured to obtain said direction from the directional microphone.

11. The lighting device according to claim 1, wherein the lighting device comprises a further light source, wherein the further light source is arranged to provide ambient lighting.

12. The lighting device according to claim 11, wherein the processor is configured to control the further light source to transmit, if the processor determines a negative intelligibility of the audio signal, at least a part of said audio signal via a Li-Fi signal or a VLC signal.

13. The lighting device according to claim 1, wherein the lighting device comprises a speaker, wherein the processor is configured to control the speaker to transmit, if the processor determines a negative intelligibility of the audio signal, at least a part of said audio signal.

14. A system for determining and conveying an intelligibility of an audio signal, wherein the system comprises at least two lighting devices according to claim 1.

15. A method of determining and conveying an intelligibility of an audio signal, wherein the audio signal comprises a plurality of occurrences of a repeating audio feature, wherein each occurrence of the repeating audio feature comprises a respective value of an acoustic characteristic, wherein the method comprises:
  detecting the audio signal;
  determining a baseline value based on said audio signal;
  determining a positive intelligibility of the audio signal if the last occurrence of the repeating audio feature comprises a respective value of the acoustic characteristic being at least equal to the baseline value, or
  determining a negative intelligibility of the audio signal if the last occurrence of the repeating audio feature comprises a respective value of the acoustic characteristic being less than the baseline value, and
  controlling a light source to convey the determined positive and/or negative intelligibility of the audio signal via a lighting characteristic.

* * * * *